United States Patent [19]

Ghiani et al.

[11] Patent Number: 4,997,033
[45] Date of Patent: Mar. 5, 1991

[54] HEAT EXCHANGER FOR COOLING THE COOLING WATER AND THE CHARGE AIR OF AN INTERNAL COMBUSTION ENGINE

[75] Inventors: Franco Ghiani, Bietigheim-Bissingen; Reinhard Kull, Ludwigsburg, both of Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 531,706

[22] Filed: Jun. 1, 1990

[30] Foreign Application Priority Data

Jun. 3, 1989 [DE] Fed. Rep. of Germany ....... 3918176

[51] Int. Cl.$^5$ ............................................... F28F 9/00
[52] U.S. Cl. ..................................... 165/67; 165/140; 180/68.4
[58] Field of Search ............................ 165/41, 67, 140; 123/41.33, 41.49, 41.65; 180/68.4

[56] References Cited

U.S. PATENT DOCUMENTS

| 3,203,499 | 8/1965 | Bentz et al. | 180/68.4 |
| 3,229,760 | 1/1966 | Hurter et al. | 165/134.1 |
| 3,248,076 | 4/1966 | Ferguson | 180/68.4 X |
| 4,138,857 | 2/1979 | Dankowski | 62/239 |
| 4,531,574 | 7/1985 | Hoch | 165/67 |
| 4,651,816 | 3/1987 | Struss et al. | 165/76 |

FOREIGN PATENT DOCUMENTS

| 2558895 | 7/1977 | Fed. Rep. of Germany | 165/67 |
| 3023496 | 2/1981 | Fed. Rep. of Germany | . |
| 3536457 | 6/1987 | Fed. Rep. of Germany | . |
| 3744360 | 7/1989 | Fed. Rep. of Germany | . |
| 59-202937 | 11/1984 | Japan | 180/68.4 |
| 2054125 | 2/1981 | United Kingdom | . |
| 2182004A | 5/1987 | United Kingdom | 180/68.4 |

Primary Examiner—Martin P. Schwadron
Assistant Examiner—Allen J. Flanigan
Attorney, Agent, or Firm—Foley & Lardner, Schwartz, Jeffery, Schwaab, Mack, Blumenthal & Evans

[57] ABSTRACT

A heat exchanger for cooling the cooling water and the charge air of an internal combustion engine, comprising an air-to-water cooler for the cooling water and an air-to-water cooler for cooling the compressed charge air, the air-to-air cooler being arranged in the air-flow direction, preferably in front of the air-to-water cooler, and the air-to-water cooler having lateral fixing projections and/or recesses for fixing to a supporting frame, in particular of a vehicle, wherein the air-to-water cooler has additional fixing means for the air-to-air cooler in which the latter, with allocated projections, is hung in place and held.

16 Claims, 8 Drawing Sheets

HEAT EXCHANGER FOR COOLING THE COOLING WATER AND THE CHARGE AIR OF AN INTERNAL COMBUSTION ENGINE

BACKGROUND OF THE INVENTION

1. Field of the Invention

The invention relates to a heat exchanger for cooling the cooling water and the charge air of an internal combustion engine, comprising an air-to-water cooler for the cooling water and an air-to-air cooler for cooling the compressed charge air, wherein the air-to-air cooler is arranged in the air-flow direction, preferably in front of the air-to-water cooler, and the air-to-water cooler has lateral fixing projections and/or recesses for fixing to a supporting frame in particular of a vehicle.

2. Description of the Prior Art

The charge-air coolers are normally fixed in front of the air-to-water cooler to a supporting frame of a vehicle. The requisite fixing means increase the construction weight and in particular the assembly and servicing times. Furthermore, it is known to screw the air-to-air cooler to the air-to-water cooler to form a unit. Here, however, there are the same disadvantages during assembly and servicing.

SUMMARY OF THE INVENTION

In order to avoid the disadvantages described, it is one object of the present invention to provide a heat exchanger of the type mentioned at the beginning in which assembly and servicing can be effected quickly in a time-saving manner with few manipulations, if possible without any tools.

To achieve this object, the air-to-water cooler is provided with additional fixing means for the air-to-air cooler in which the latter, with allocated projections, is hung in place and held.

Because the air-to-air cooler can be hung in place in a simple manner, no tools and no loose fixing means, which normally also have to be additionally secured on account of the vibrations which always occur, are required when assembling and dismantling the air-to-air cooler.

The projections of the air-to-air cooler, in order to hang the air-to-air cooler in place in the fixing means of the air-to-water cooler, are conveniently arranged approximately symmetrically relative to the center of gravity of the air-to-air cooler so that mass forces occurring in operation are absorbed directly as far as possible and thus the material stress of the parts, which are normally made of plastic, is kept down. Undesired tilting moments cannot arise at all in the area of the center of gravity when the mass forces which occur are absorbed.

The forces which occur are especially large in the area of the charge-air connecting branches. It is therefore particularly advantageous when the projections of the air-to-air cooler are integrated with its charge-air connecting branches, wherein these charge-air connecting branches protrude laterally beyond the air-to-air cooler and are run laterally past the air-to-water cooler.

The air-to-air cooler can be held particularly advantageously in a centered manner relative to the air-to-water cooler by the projections of the air-to-air cooler and the allocated fixing means of the air-to-water cooler. For this purpose, the fixing means of the air-to-water cooler can have sloping insertion surfaces which center the air-to-air cooler on assembly during insertion from above. Thus, assembly becomes particularly simple, since the air-to-air cooler to be hung in place does not have to be put in exactly in the precise position but finds the correct final position itself when being lowered on assembly, and special alignment is thus unnecessary.

Spontaneous release of the air-to-air cooler from the air-to-water cooler can be reliably prevented by the ends of the sloping insertion surfaces snapping behind retaining lugs of the projections of the air-to-air cooler. The sloping insertion surfaces can be formed in a particularly simple manner by elastic, flexible plastic tongues which in turn can themselves be extensions of parallel ribs which protrude laterally beyond the air-to-air cooler.

The effort involved in manufacture and assembly, and at the same time the construction weight, can be further reduced by the fixing means of the air-to-water cooler being integrated in one piece with the water box made of plastic.

A particularly favorable force transmission can be achieved when the projections arranged on the charge-air connecting branch are two ribs which are arranged in parallel at a distance apart and in each case have a retaining lug, and when the two retaining lugs are supported on fork-shaped fixing means of the air-to-water cooler, and when the part of the parallel ribs which is located below the retaining lugs is accommodated between the fork-shaped fixing means. The fork-shaped fixing means can be formed by two rib projections which are U-shaped in cross-section and have two ribs arranged in parallel at a distance from each other, adjoining the ends of which ribs are transverse ribs pointing outward.

To prevent a mutual tilting movement between the air-to-water cooler and the air-to-air cooler, in the air-to-water cooler, as a further fixing means, an accommodation slot open at the top can be provided at a distance below the charge-air connecting branch, and on the air-to-air cooler, as a further projection, an L-leg angled downward can be provided, the end of which L-leg is held by the accommodation slot open at the top. The further projection in the form of the L-leg can be integrated in one piece with the air box, preferably made of plastic, of the air-to-air cooler.

To, further transmit force, vertical bearing surfaces corresponding to one another can be provided at the top end of the air-to-water cooler and the air-to-air cooler.

BRIEF DESCRIPTION OF THE DRAWINGS

Further embodiments according to the invention are revealed in the dependent claims and are described together with their advantages in greater detail below with reference to the appended drawings, in which:

DETAILED DESCRIPTION OF THE PREFERRED EMBODIMENTS

In the preferred embodiment shown, the heat exchanger has an air-to-water cooler 1 for cooling the cooling water of an internal combustion engine and an air-to-air cooler 2 for cooling the compressed charge air. The air-to-water cooler 1, of which only the left hand part is shown in FIGS. 2, 4, 5 and 6, is formed to be essentially symmetric to its vertical axis. At the level of its center of gravity it carries laterally projecting claw-like fixing projections 3 which are stiffened by ribs and are integrated with a water box 11 of the air-to-water cooler 1, which is made of plastic.

Figure 2:
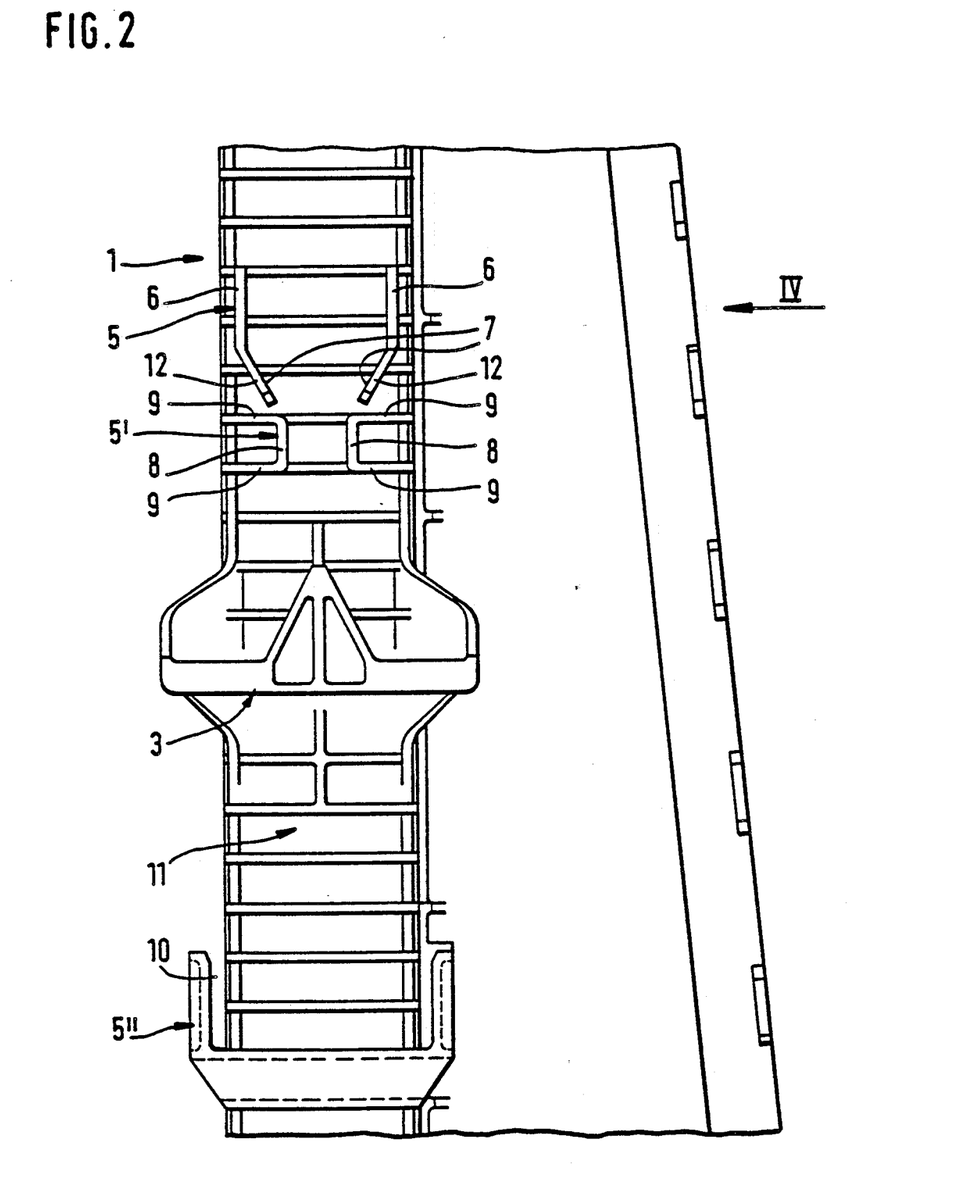
FIG. 2 shows a view, corresponding to FIG. 1, of the air-to-water cooler alone.
Figure 4:
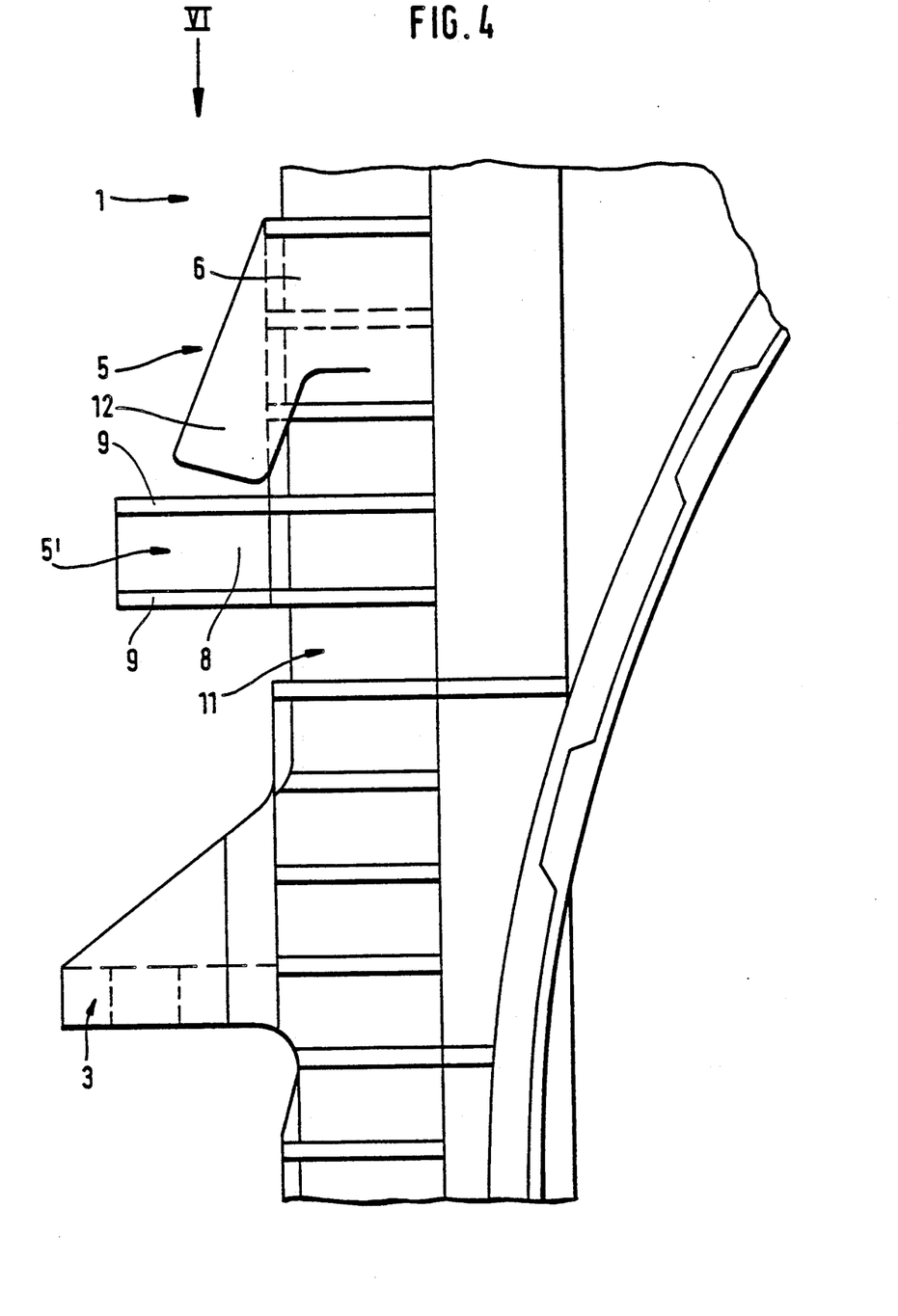
FIG. 4 shows a partial view, corresponding to FIG. 3, of the air-to-water cooler alone on an enlarged scale.

Fixing means 5, 5' for accommodating the air-to-air cooler 2 are provided above the fixing projections 3, which fixing means 5, 5' can best be recognized in FIGS. 2 and 4. The fixing means 5 have two parallel, vertical ribs 6 which protrude tangentially from the rounded water box 11. The bottom, free ends of the ribs 6 are angled towards one another and form sloping insertion surfaces 7 by which, during insertion from above, the air-to-air cooler is inserted in a centered manner into the fixing means 5'.

The fixing means 5' is arranged above the fixing projection 3, is formed in a fork shape, is likewise integrated in one piece with the water box 11 of the air-to-water cooler and is essentially formed by two ribs 8 running vertically and in parallel at a distance apart, the ends of which ribs 8 merge into transverse ribs 9 directed horizontally outward so that the fixing means 5' has a double-U cross-section (FIG. 2).

To absorb any tilting moment which may occur, a further fixing means 5" as well as a perpendicular accommodation slot 10 open at the top are provided at a distance below the fixing projection 3.

The fixing means 5, 5', 5" are made in one piece with the water box 11, made of plastic, of the air-to-water cooler 1.

The ends of the ribs 6 sloping toward one another at the bottom are flexible plastic tongues 12 which center and hold the air-to-air cooler 2 pushed in from above.

Figure 1:
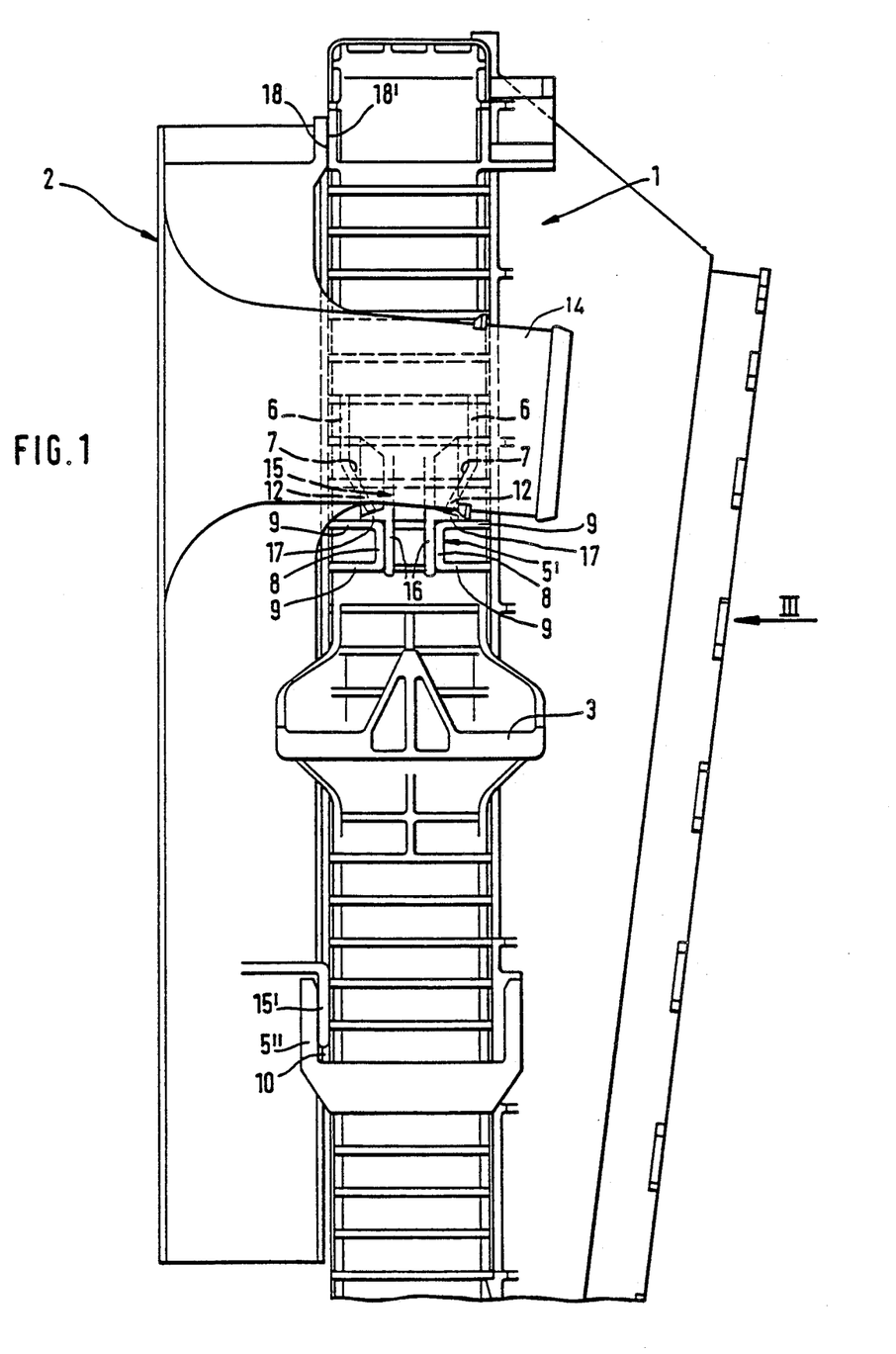
FIG. 1 shows a partial side view of a heat exchanger composed of an air-to-air cooler and an air-to-water cooler.
Figure 3:
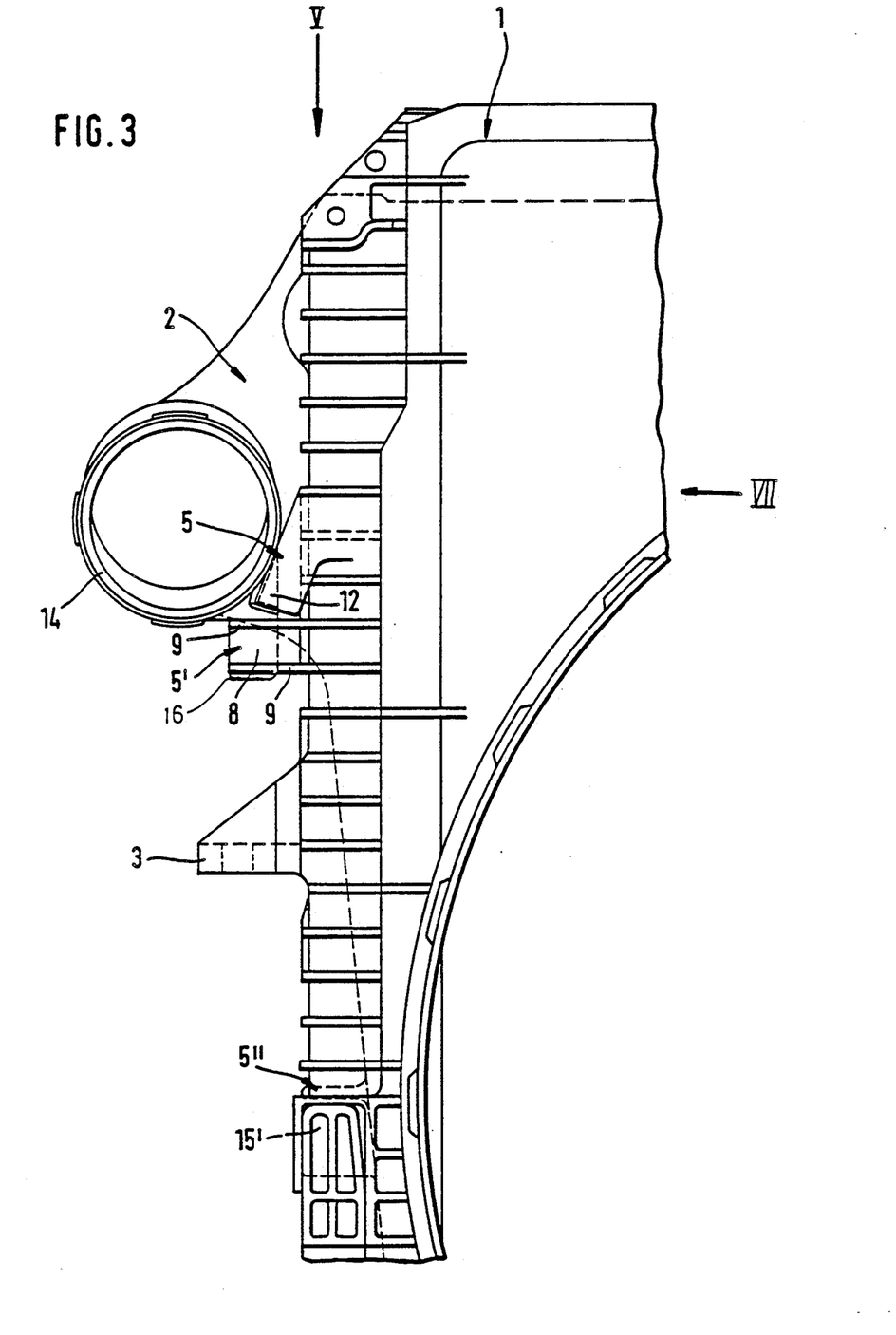
FIG. 3 shows a view of the heat exchanger shown in FIG. 1 in the direction of arrow III in FIG. 1.
Figure 5:
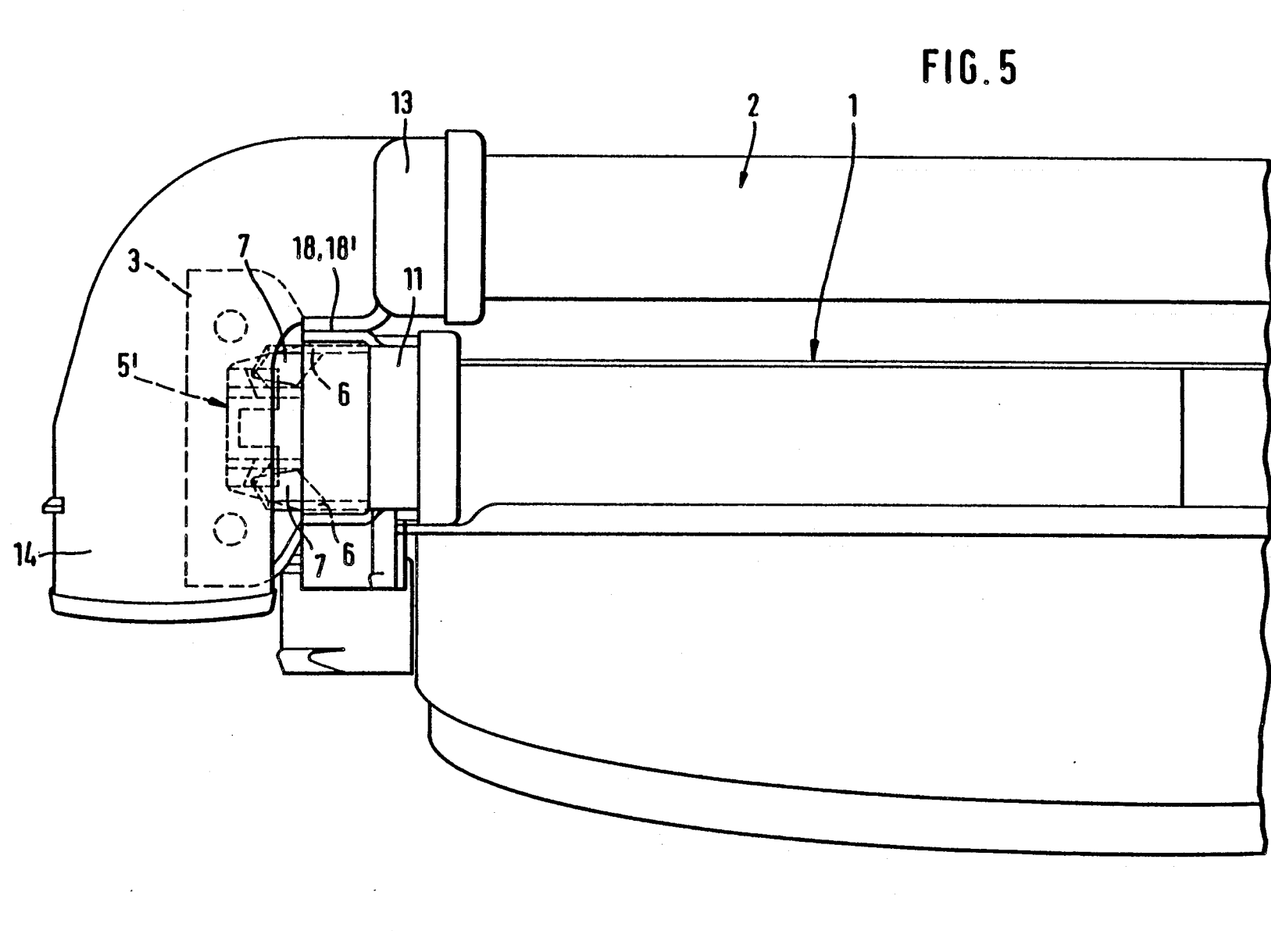
FIG. 5 shows a partial plan view in the direction of arrow V of the heat exchanger shown in FIG. 3.
Figure 6:
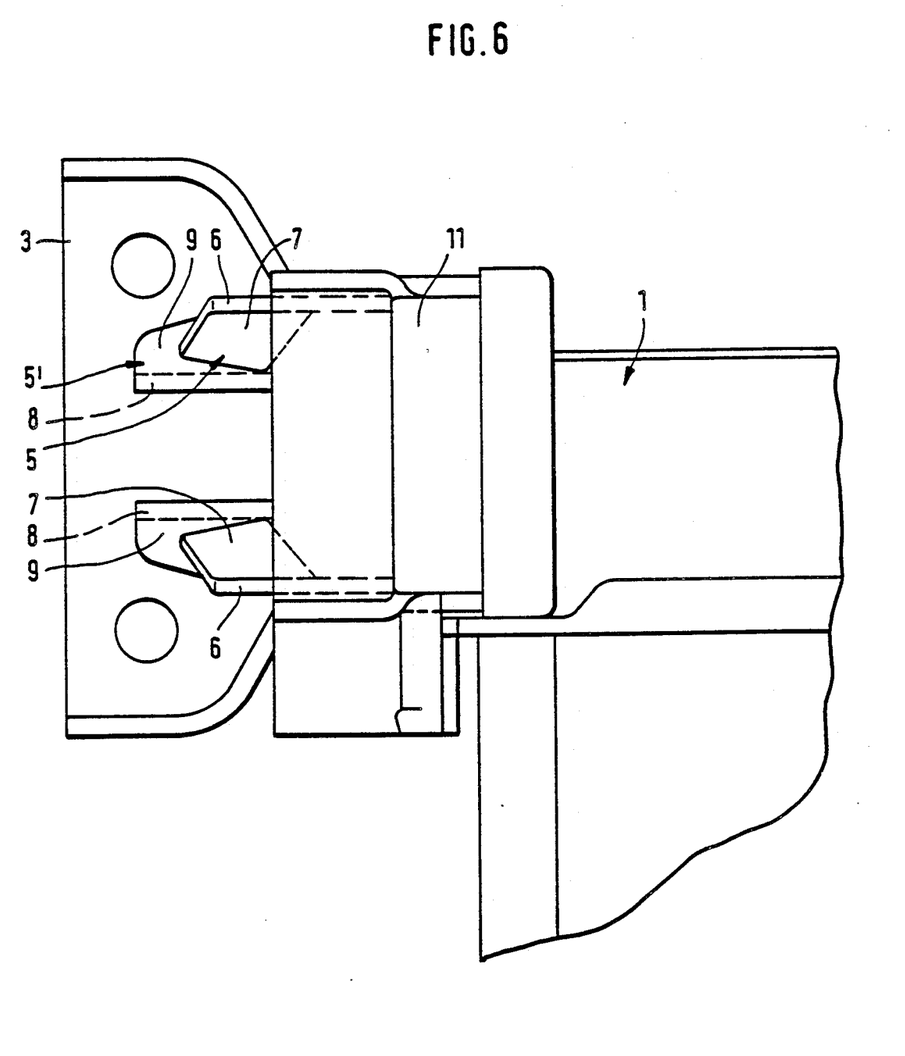
FIG. 6 shows a plan view, corresponding to FIG. 5, of the water-to-air heat exchanger alone on an enlarged scale.
Figure 7:
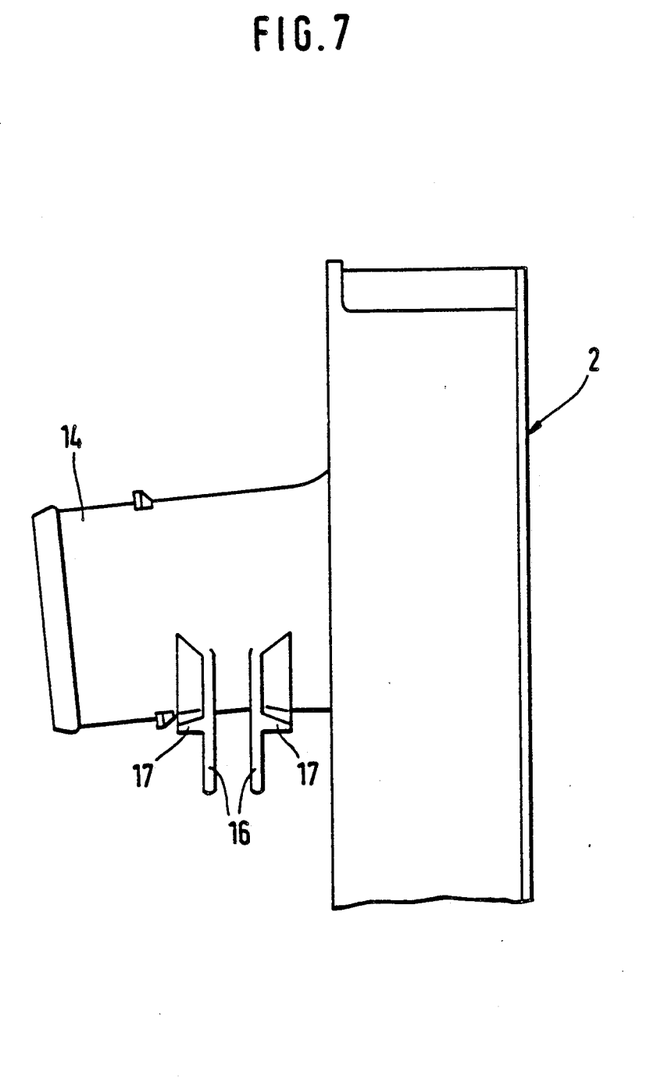
FIG. 7 shows a view of the air-to-air cooler alone in the direction of arrow VII in FIG. 3.

The air-to-air cooler 2, on both sides, has in each case an air box 13 which is made of plastic and on which charge-air connecting branches 14 are integrally formed in one piece, which charge-air connecting branches 14 are run laterally around the air-to-water cooler 1 (FIG. 5). A projection 15 is in each case provided on the inside below the charge-air connecting branches 14, which projection 15 is centered and held by the fixing means 5, 5' of the air-to-water cooler 1. Such a projection 15 is formed by two vertical ribs 16 which are in parallel at a distance from one another and have retaining lugs 17 which project laterally outward (FIG. 7). In the assembled state, ribs 16 are accommodated between the vertical ribs 8 of the fork-shaped fixing means 5', and the retaining lugs 17 rest on the top transverse ribs 9 of the fork-shaped fixing means 5'(FIGS. 1 and 3). On assembly, the flexible ends of the plastic tongues 12 snap behind these retaining lugs 17 or across the upper surfaces of the retaining lugs, respectively, in a flexible manner and thus prevent the air-to-air cooler 2 from being lifted up relative to the air-to-water cooler 1 (FIG. 1).

Provided at a distance below the projection 15 is a further projection 15' in the form of an L-leg which is likewise integrated in one piece with the air box 13, the angled end of this projection 15' being accommodated in the accommodation slot 10 of the further fixing means 5" and fixing the air-to-air cooler 2 at the desired distance relative to the air-to-water cooler 1. Top bearing surfaces 18, 18' are provided approximately in the same plane at the top end of the coolers 1, 2, which bearing surfaces 18, 18' can transmit acceleration forces and forces arising during vibrations.

No tools at all are required for assembling the air-to-air cooler 2. The air-to-air cooler 2 is simply placed in position in front of and above the air-to-water cooler 1 and lowered down. A mutual correction of the position is automatically effected by the sloping insertion surfaces 7 of the fixing means 5 in combination with the projection 15.

Figure 8:
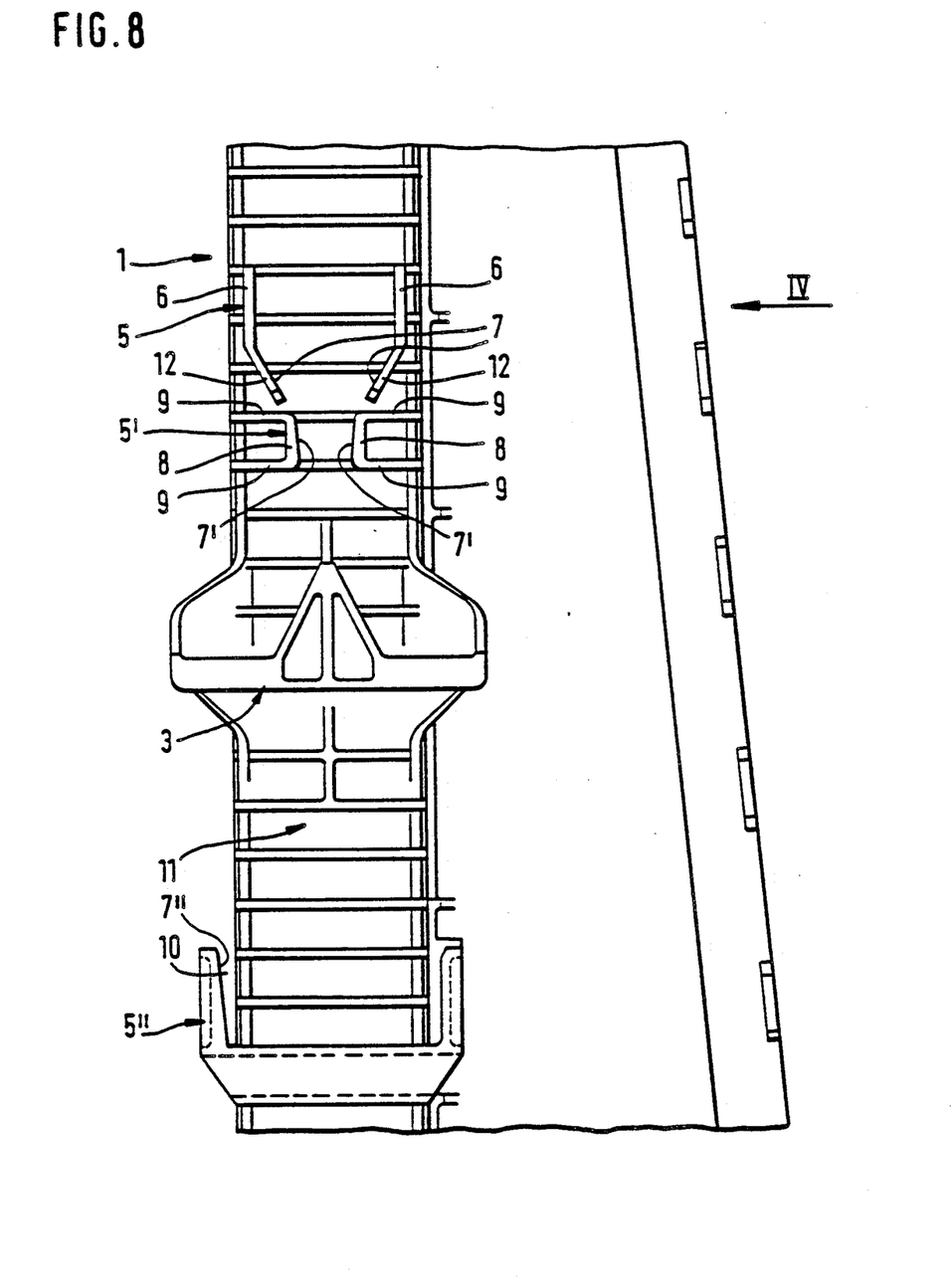
FIG. 8 shows a view corresponding to FIG. 1 of the air-to-water cooler alone with slightly modified fixing means.

As can be seen in FIG. 8, which shows a modification of the air-to-water cooler of FIG. 2, the fixing means 5' and further fixing means 5" can be provided with sloping insertion surfaces 7', 7" to facilitate insertion of the respective projections 15, 15" of the air-to-air cooler 2, thus effecting a positioning of the coolers 1, 2 to each other.

What is claimed is:

1. A heat exchanger assembly for cooling water and charge-air of an internal combustion engine, comprising:
   an air-to-water cooler for the cooling of the water, including first, second and third fixing means; and
   an air-to-air cooler for cooling of the charge-air, and including first and second projections, said first projection being insertable to said first and second fixing means and said second projection cooperating with said third fixing means, for holding said air-to-air cooler adjacent said air-to-water cooler.

2. The heat exchanger as claimed in claim 1, wherein the first and second projections of the air-to-air cooler held by the respective first, second and third fixing means of the air-to-water cooler are arranged approximately symmetrically with respect to the center of gravity of the air-to-air cooler.

3. The heat exchanger as claimed in claim 1, wherein said air-to-air cooler comprises a charge-air connecting branch, said charge-air connecting branch protruding laterally beyond the air-to-air cooler and being run laterally past the air-to-water cooler and including the first projection integrated therewith.

4. The heat exchanger as claimed in claim 3, wherein the air-to-air cooler is held in a centered manner relative to the air-to-water cooler by the first and second projections of the air-to-air cooler interacting with the respective first, second and third fixing means of the air-to-water cooler.

5. The heat exchanger as claimed in claim 4, wherein each of the first, second and third fixing means of the air-to-water cooler include inclined sloping insertion surfaces, which center the air-to-air cooler on assembly when the first and second projections being inserted in said first, second and third fixing means, respectively.

6. The heat exchanger as claimed in claim 5, wherein the inclined sloping insertion surfaces of the first fixing means include lower ends, and at least said ends bear laterally in a flexible manner against the first projection of the air-to-air cooler in the final assembled position of the heat exchanger.

7. The heat exchanger as claimed in claim 5, wherein the inclined sloping insertion surfaces of the first fixing means include lower ends, said ends snap behind retaining lugs of the first projection of the air-to-air cooler.

8. The heat exchanger as claimed in claim 7, wherein the inclined sloping insertion surface of the first fixing means is formed by elastic and flexible plastic tongues.

9. The heat exchanger as claimed in claim 8, wherein the plastic tongues serving as inclined sloping insertion surfaces are extensions of parallel ribs which protrude laterally from the air-to-water cooler.

10. The heat exchanger as claimed in claim 9, wherein the first, second and third fixing means of the air-to-water cooler are integrated in one piece with a water tank made of plastic of the air-to-water cooler.

11. The heat exchanger as claimed in claim 3, wherein said second fixing means formed on the air-to-water cooler are fork-shaped and the first projection protruding from the charge-air connecting branch includes two ribs being arranged in parallel at a distance apart and each comprise a retaining lug, and wherein the two retaining lugs being respectively supported on the fork-shaped second fixing means, and a part of the parallel ribs located below the retaining lugs are accommodated between the fork-shaped second fixing means.

12. The heat exchanger as claimed in claim 11, wherein the fork-shaped second fixing is formed by two rib protrusions each being U-shaped in cross-section and include two ribs arranged in parallel at a distance from one another and having transverse ribs at outside ends of said ribs.

13. The heat exchanger as claimed in claim 11, wherein the third fixing means comprises an accommodation slot open at the top provided at a distance below the charge-air connecting branch on the air-to-water cooler, and the second projection comprises a L-leg angled downward, with one end of said L-leg being held by the accommodation slot.

14. The heat exchanger as claimed in claim 13, wherein the L-leg of said second projection is integrated in one piece on the air-to-air cooler.

15. The heat exchanger as claimed in claim 1, wherein vertical bearing surface arranged with respect to one another are provided at the top end of the air-to-water cooler and the air-to-air cooler, respectively.

16. A heat exchanger assembly according to claim 1, wherein said air-to-water cooler includes lateral fixing means for fixing said air-to-water cooler in a supporting frame of a vehicle, with said air-to-air cooler being arranged in front of said air-to-water cooler.

* * * * *